United States Patent [19]

Shimizu et al.

[11] Patent Number: 4,956,244
[45] Date of Patent: Sep. 11, 1990

[54] APPARATUS AND METHOD FOR REGENERATING ELECTROLYTE OF A REDOX FLOW BATTERY

[75] Inventors: Masayuki Shimizu; Tatsuhiko Sakamoto; Toshio Shigematsu, all of Osaka, Japan

[73] Assignees: Sumitomo Electric Industries, Ltd.; The Kansai Electric Power Co., Inc., both of Osaka, Japan

[21] Appl. No.: 360,321

[22] Filed: Jun. 2, 1989

[30] Foreign Application Priority Data
Jun. 3, 1988 [JP] Japan .................. 63-137674

[51] Int. Cl.⁵ .................................. H01M 8/06
[52] U.S. Cl. .................................. 429/17; 429/21; 204/130
[58] Field of Search .............. 429/21, 17; 204/94, 204/130, 263

[56] References Cited

U.S. PATENT DOCUMENTS

| | | | |
|---|---|---|---|
| 4,576,878 | 3/1986 | Gahn | 429/21 |
| 4,765,872 | 8/1988 | Hamano et al. | 204/130 |
| 4,814,241 | 3/1989 | Nagashima et al. | 429/21 |

Primary Examiner—Donald L. Walton
Assistant Examiner—Donald L. Walton
Attorney, Agent, or Firm—W. G. Fasse; D. H. Kane, Jr.

[57] ABSTRACT

Deteriorated positive electrolyte containing $Fe^3/Fe^{2+}$ ions for a redox flow battery is regenerated in a negative electrolyte chamber of an electrolyte regenerating apparatus. For this purpose, a formic acid solution is introduced into a positive electrolyte chamber of the electrolyte regenerating apparatus and a voltage is applied between a negative electrode of the negative electrolyte chamber and a positive electrode of the positive electrolyte chamber, whereby excessive $Fe^{3+}$ ions in the deteriorated positive electrolyte are changed to $Fe^{2+}$ ions for regeneration. The formic acid is changed into carbon dioxide which is not noxious. All gases generated by the regeneration are not noxious, whereby the regeneration can be carried out with safety.

14 Claims, 5 Drawing Sheets

APPARATUS AND METHOD FOR REGENERATING ELECTROLYTE OF A REDOX FLOW BATTERY

FIELD OF THE INVENTION

The present invention relates to an apparatus and a method for regenerating electrolyte of a redox flow battery and particularly to an electrolyte regenerating apparatus for a redox flow battery, which is safe and easy to handle.

BACKGROUND INFORMATION

Electric power companies must take into account the demand for electric power in order to generate and supply stable electric power to consumers. For this purpose, electric power companies always make efforts to have power stations for satisfying the largest demand, so that electricity can be generated according to the demand. However, as shown by the power demand curve A in FIG. 1, there is a large difference between a demand for power at daytime and that at night time. Similar phenomena can be observed for different time periods such as weeks, months or seasons.

Figure 1:
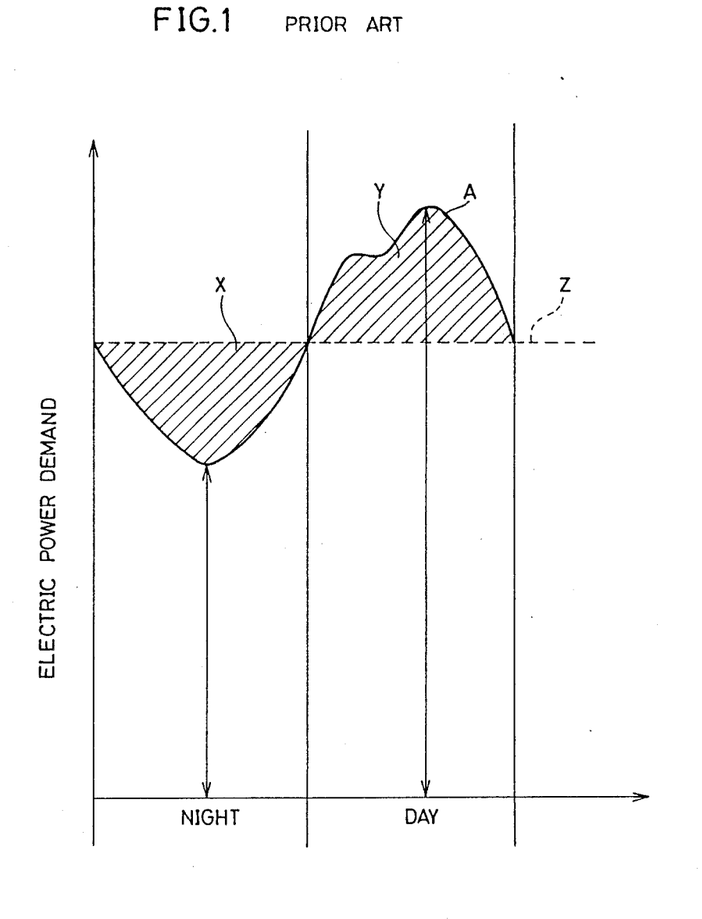
FIG. 1 is a diagram showing a power demand curve.

Therefore, if it is possible to store electric power with high efficiency, surplus power, corresponding to the portion shown by X in FIG. 1, can be stored at an off-peak time and supplied at a peak time so that the portion shown by Y in FIG. 1 may be made up for by such stored surplus power. In such a manner, the supply of power can be made to correspond to changes in demand and the electric companies need only generate an almost constant power quantity corresponding to the broken line Z in FIG. 1 at all times. If such capacity load leveling can be accomplished, it is possible to allow the electric utilities to maximize the use of the most efficient base load plants.

Therefore, various power storage methods have been proposed. For example, a pumped hydro storage power generation method has been already practically utilized. According to the pumped hydro storage power generation method, a power station is located at a considerable distance from the place where power is consumed. Consequently, this method has disadvantages such as transmission and transformation losses and limited locations for the stations in view of environmental conditions. In consequence, it is desired to develop new power storing techniques in place of the pumped hydro storage power generation method. Redox flow batteries are being developed as one of such techniques.

Figure 2:
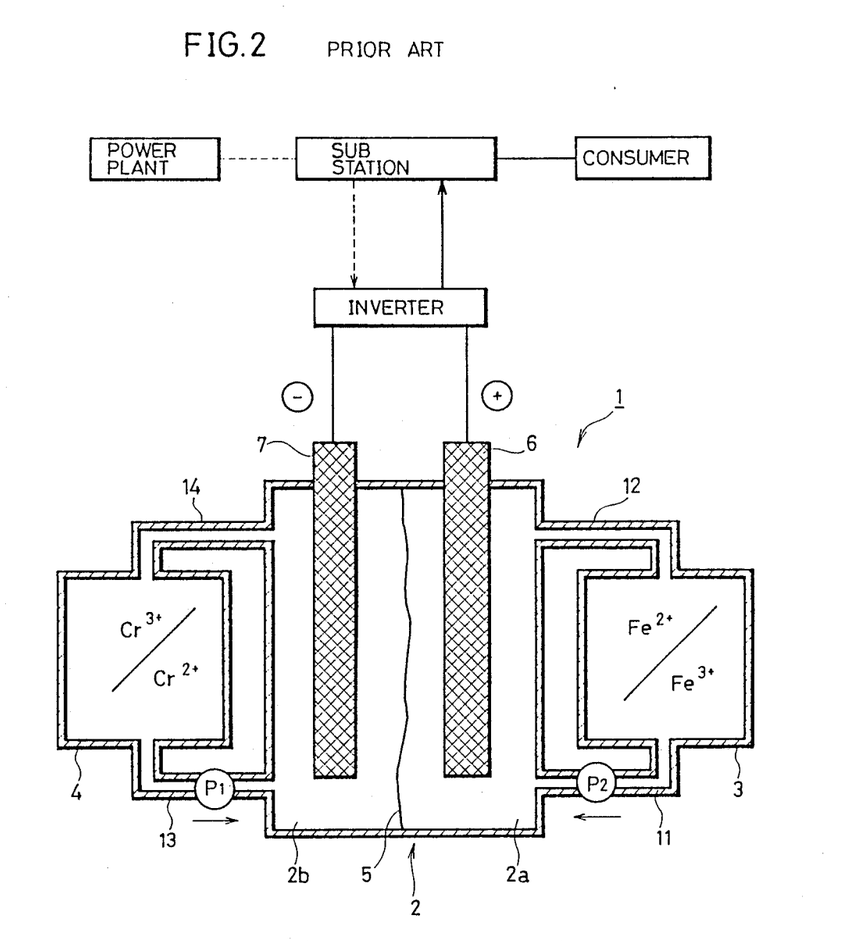
FIG. 2 is a schematic structural view of an example of a conventional redox flow battery.

FIG. 2 is a schematic structural view of an example of an already proposed redox flow battery. This redox flow battery 1 comprises a cell 2, a positive electrolyte tank 3 and a negative electrolyte tank 4. Since the two tanks 3 and 4 are used, this battery is called a 2-tank type battery. The cell 2 is separated by a membrane formed by an ion exchange membrane 5 for example, so that a positive electrode cell 2a and a negative electrode cell 2b are formed by the separation. A positive electrode 6 is provided in the positive electrode cell 2a, while a negative electrode 7 is provided in the negative electrode cell 2b.

The positive electrode cell 2a and the positive electrolyte tank 3 are connected through first and second pipes 11 and 12. The negative electrode cell 2b and the negative electrolyte tank 4 are connected through third and fourth pipes 13 and 14. A positive electrolyte is introduced as a reaction solution into the positive electrolyte tank 3 and a negative electrolyte is introduced as a reaction solution into the negative electrolyte tank 4. A pump P2 as reaction solution supply means is provided in the first pipe 11, while a pump P1 is provided in the second pipe 13. The positive and negative electrolyte react in the positive and negative electrode cells 2a and 2b, respectively. The positive electrolyte after the reaction returns into the positive electrolyte tank 3 through the second pipe 12, while the negative electrolyte after the reaction returns into the negative electrolyte tank 4 through the fourth pipe 14.

In the redox flow battery shown in FIG. 2, a solution of ions such as iron ions having a variable valence is used as the positive electrolyte and a solution of ions such as chromium ions having a variable valence is used as the negative electrolyte.

If hydrochloric acid solution containing a positive reactant $Fe^{3+}/Fe^{2+}$ is used as the positive electrolyte and hydrochloric acid solution containing a negative reactant $Cr^{3+}/Cr^{3+}$ is used as the negative electrolyte, reactions at the positive electrode 6 and at the negative electrode 7 are as follows:

An electromotive force of about 1 volt is obtained by the electrochemical reactions represented by the above formulas.

However, in reality, the above mentioned electrochemical reactions do not proceed equally at the positive and negative electrodes 6 and 7 as described above. This phenomenon is considered to be caused by the side reactions described below.

First, hydrogen gas is generated at the negative electrode at the end of a charging period and, as a result, an absolute quantity of oxidation-reduction pairs $(Cr^{3+}/Fe^{2+}$ or $Cr^{2+}+Fe^{3+})$ is decreased.

Secondly, $Cr^{2+}$ ions are relatively unstable and are liable to be oxidized by oxygen in the air and thus they are easily changed to $Cr^{3+}$ ions. In such a case, the absolute quantity of oxidation-reduction pairs caused by the battery reactions is also decreased.

If the above described side reactions occur and the absolute quantity of oxidation-reduction pairs is decreased, electric energy stored in the battery, that is, the battery capacity is decreased as a result of a repetition of charging and discharging operations. Further, the internal resistance of the battery is increased and the charge and discharge efficiency often deteriorates.

In order to solve the above described problems, an apparatus for regenerating electrolyte of a redox flow battery has been disclosed in Japanese Patent Laying-Open No. 304580/1988.

Figure 3:
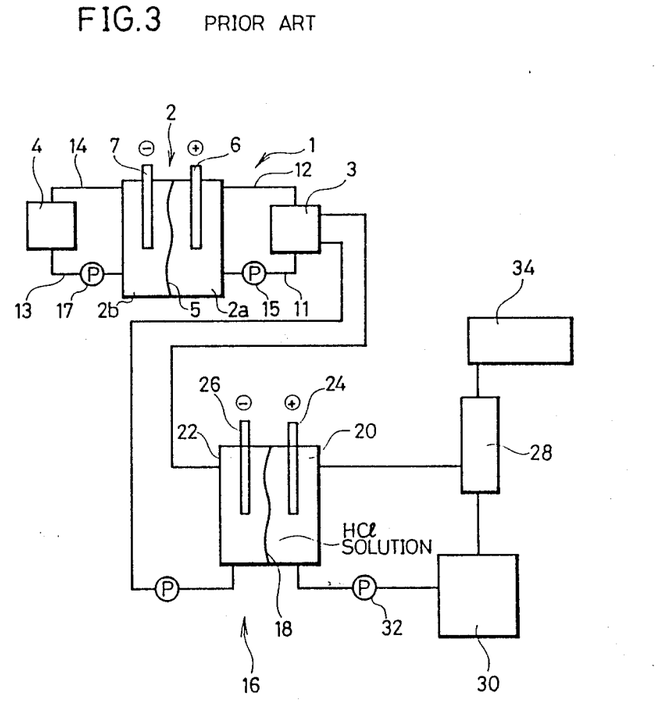
FIG. 3 is a schematic view of a redox flow battery including a conventional electrolyte regenerating apparatus.

FIG. 3 is a schematic diagram showing a construction of the apparatus for regenerating electrolyte of a redox flow battery described in Japanese Patent Laying-Open No. 304580/1988.

Referring to FIG. 3, a positive electrolyte tank 3 of the redox flow battery 1 is connected with the electrolyte regenerating apparatus 16 of the redox flow battery 1. Since the components of the redox flow battery 1 are the same as shown in FIG. 2, the description is not repeated.

The electrolyte regenerating apparatus 16 has a positive electrolyte chamber 20 and a negative electrolyte chamber 22 separated by a membrane 18. The positive electrolyte chamber 20 has a positive electrode 24 and the negative electrolyte chamber 22 has a negative electrode 26. Voltage applying means (not shown) for applying a voltage to the positive and negative electrodes 24 and 26 is connected to the positive and negative electrodes 24 and 26.

A gas-liquid separator 28 and a hydrochloric acid solution tank 30 are connected to the positive electrolyte chamber 20. Hydrochloric acid solution is supplied from the hydrochloric acid solution tank 30 into the positive electrolyte chamber 20 by means of a pump 32. The gas-liquid separator 28 separates chlorine gas generated in the positive electrolyte chamber 20, from the hydrochloric acid solution. A chlorine gas absorbing device 34 for absorbing the separated chlorine gas is connected to the gas-liquid separator 28.

The negative electrolyte chamber 22 is connected to the positive electrolyte tank 3 of the redox flow battery 1 so that the positive electrolyte in the positive electrolyte tank 3 of the redox flow battery 1 is supplied into the negative electrolyte chamber 22 and is discharged from the negative electrolyte chamber 22 to the positive electrolyte tank 3.

The above described electrolyte regenerating apparatus operates as follows when using $Fe^{3+}/Fe^{2+}$ ions as the positive reactant and $Cr^{3+}/Cr^{2+}$ ions as the negative reactant.

While charging and discharging operations are repeated in the redox flow battery 1, the amount of $Fe^{3+}$ ions (or $Cr^{3+}$ ions) of the oxidation-reduction pairs becomes excessive causing a deterioration of the electrolyte as described above. In this electrolyte regenerating apparatus, the excessive $Fe^{3+}$ ions are reduced by using the electrolyte regenerating apparatus 16 as described below. Accordingly, the $Fe^{2+}$ ions are regenerated and a normal balance of the oxidation-reduction pairs is maintained.

More specifically, the positive electrolyte supplied from the positive electrolyte tank 3 of the redox flow battery 1 to the negative electrolyte chamber 22 of the electrolyte regenerating apparatus 16 reacts according to the below indicated formula (1) when a voltage is applied to the electrodes 24 and 26.

(1)

Hydrochloric acid supplied from the hydrochloric acid solution tank 30 to the positive electrolyte chamber 20, reacts according to the below indicated formulas (2) and (3).

(2)

(3)

Consequently, in the electrolyte regenerating apparatus 16, $Fe^{3+}$ ions are reduced to $Fe^{2+}$ ions at the negative electrode 26 and chlorine gas as well as oxygen gas are generated at the positive electrode 24. This chlorine gas is separated from the hydrochloric acid solution by the gas-liquid separator 28 and it is absorbed by the chlorine gas absorbing device 34. When the positive electrolyte containing the $Fe^{2+}$ ions reduced by the electrolyte regenerating apparatus 16 is returned to the positive electrolyte tank 3 of the redox flow battery 1, the quantity of the oxidation-reduction pairs in the redox flow battery 1 is restored to the initial value.

If the electrolyte regenerating described above is connected to a redox flow battery, the balance of the oxidation-reduction pairs of the electrolyte of the redox flow battery is maintained normal and the battery capacity is restored.

However, since hydrochloric acid solution is used as a solution for electrochemically regenerating the positive electrolyte of the redox flow battery 1, noxious chlorine gas is generated in the positive electrolyte chamber, causing a safety hazard. In a practical use, safety can be ensured if the gas absorbing device 34 is provided. However, in such a case, the apparatus has a large size and the handling thereof becomes complicated.

In addition, since chlorine gas is treated, the apparatus needs to be made of a corrosion-resistant material. Furthermore, in order to prevent leakage of chlorine gas, it is necessary to take effective measures for air tightness of the apparatus. As a result, the apparatus is very expensive.

SUMMARY OF THE INVENTION

Therefore, it is an object of the present invention to provide an apparatus for regenerating electrolyte of a redox flow battery, in which the battery capacity of the redox flow battery can be restored to an initial capacity value.

Another object of the present invention is to provide an apparatus for regenerating electrolyte of a redox flow battery, in which the battery capacity of the redox flow battery can be restored to an initial capacity value without generation of noxious gas.

Still another object of the present invention is to provide an apparatus for regenerating electrolyte of a redox flow battery, which is safe to operate and easy to handle.

A further object of the present invention is to provide an apparatus for regenerating electrolyte of a redox flow battery, which can be made compact.

A still further object of the present invention is to provide an apparatus for regenerating electrolyte of a redox flow battery, which can be manufactured with inexpensive materials.

A still further object of the present invention is to provide an apparatus for regenerating electrolyte of a redox flow battery, which is safe in operation and in which electrodes used in the apparatus are not deteriorated.

A still further object of the present invention is to provide a method for regenerating electrolyte of a redox flow battery, making it possible to recover a battery capacity of the redox flow battery to an initial capacity value without generating noxious gas.

A still further object of the present invention is to provide a method for regenerating electrolyte of a redox flow battery, in which a battery capacity can be maintained constantly at an initial capacity value.

In order to accomplish the above described objects, an apparatus for regenerating electrolyte of a redox flow battery according to the present invention includes a negative electrolyte chamber and a positive electrolyte chamber. Positive electrolyte of the redox flow battery is introduced into the negative electrolyte chamber from a positive electrolyte tank of the battery through an inlet pipe. The negative electrolyte chamber has a negative electrode immersed in the positive electrolyte. The positive electrolyte chamber is connected to the negative electrolyte chamber through a membrane and it contains a formic acid solution and a positive electrode immersed in this formic acid solution. The electrolyte regenerating apparatus according to the present invention further includes voltage applying a means for applying a voltage between the positive for negative electrodes and emitting electrons from the above mentioned formic acid solution so that a portion of the metal ions in a high valence state contained in the positive electrolyte, can be changed to metal ions in a low valence state. This apparatus further includes an outlet pipe for returning the positive electrolyte containing the metal ions in the low valence state, to the above mentioned positive electrolyte tank.

In the present electrolyte regenerating apparatus the concentration of the formic acid solution cannot be generally limited because it depends on conditions of use of the battery, but the formic acid solution is normally a solution containing formic acid of more than 40 wt.% and more preferably a solution containing formic acid of more than 80 wt.%. If the concentration is lower than the above mentioned lowest limit, the portion of the positive electrode used in the electrolyte regenerating apparatus deteriorates, causing unfavorable effects.

According to a method for regenerating electrolyte of a redox flow battery according to another aspect of the invention, a positive electrolyte of the redox flow battery is introduced into a negative electrolyte chamber having a negative electrode, through an inlet pipe. Then, a formic acid solution is introduced into a positive electrolyte chamber having a positive electrode and connected to the negative electrolyte chamber through a membrane. Thereafter, voltage is applied between the positive and negative electrodes whereby electrons are emitted from the formic acid solution so that a portion of the metal ions in a high valence state contained in the positive electrolyte, are changed to metal ions in a low valence state. Then, the above mentioned positive electrolyte containing the metal ions in the low valence state, is returned to the redox flow battery.

In the negative electrolyte chamber of the electrolyte regenerating apparatus according to the present invention, an electrochemical reaction as indicated below occurs.

Thus, $Fe^{3+}$ ions are changed to $Fe^{2+}$ ions, whereby the quantity of oxidation-reduction pairs reattains an initial value.

Furthermore, in the positive electrolyte chamber of the electrolyte regenerating apparatus according to the present invention, electrochemical reactions as indicated below occur.

Referring to the above indicated formulas (5) and (6), the gases generated by the electrochemical reactions are carbon dioxide gas and oxygen gas. Since those carbon dioxide gas and oxygen gas are not noxious, they are easy to handle and safety is ensured even if a human inhales these gases.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS AND OF THE BEST MODE OF THE INVENTION

An embodiment of the present invention will be described in the following. However, the present invention is not limited thereto.

Figure 4:
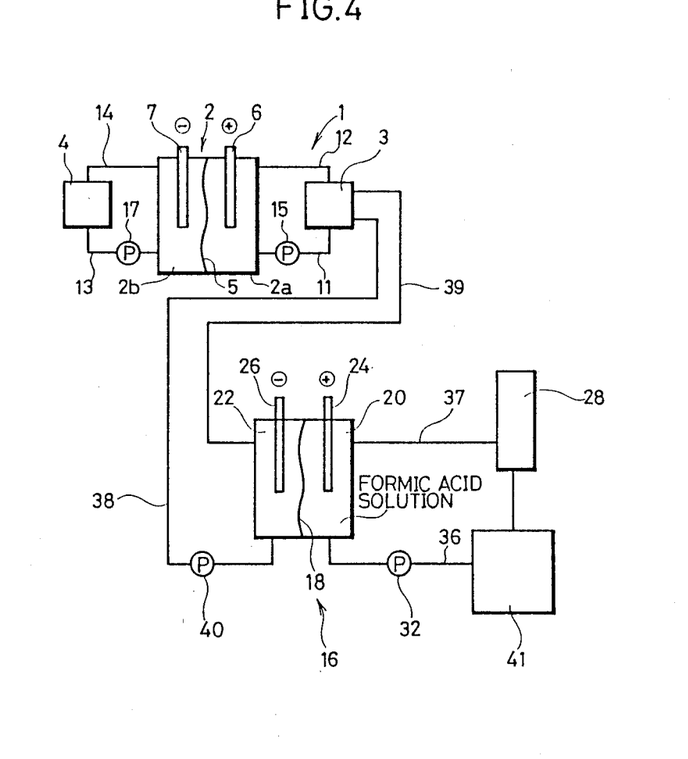
FIG. 4 is a schematic view of a redox flow battery including an electrolyte regenerating apparatus according to the present invention.

FIG. 4 is a schematic block diagram for explaining an embodiment of the invention, wherein a redox flow battery 1 comprises a cell 2, a positive electrolyte tank 3 and a negative electrolyte tank 4. The cell 2 is separated by a membrane 5 of an ion exchange membrane, for example, to form a positive electrode cell 2a in one portion and a negative electrode cell 2b in the other portion. A positive electrode 6 is provided in the positive electrode cell 2a and a negative electrode 7 is provided in the negative electrode cell 2b. The positive electrode cell 2a and the positive electrolyte tank 3 are connected by a first pipe 11 and a second pipe 12. On the other hand, the negative electrode cell 2b and the negative electrolyte tank 4 are connected by a third pipe 13 and a fourth pipe 14. Positive electrolyte containing a positive reactant such as iron ions, the valence of which changes, is stored in the positive electrolyte tank 3. Negative electrolyte containing a negative reactant such as chromium ions, the valence of which changes is stored in the negative electrolyte tank 4. The positive electrolyte is supplied to the cell 2a by a pump 15 provided in the first pipe 11. The negative electrolyte in the negative electrolyte tank 4 is supplied to the negative electrode cell 2b by a pump 17 provided in the third pipe 13. The positive electrolyte supplied to the positive electrode cell 2a reacts in the cell 2a and the solution after having reacted, returns into the positive electrolyte tank 3 through the second pipe 12. The negative electrolyte supplied to the negative electrode cell 2b reacts in the cell 2b and the solution after having reacted, returns into the negative electrolyte tank 4 through the fourth pipe 14.

An electrolyte regenerating apparatus 16 comprises a positive electrolyte chamber 20 and a negative electrolyte chamber 22. The positive electrolyte chamber 20 and the negative electrolyte chamber 22 are connected through a membrane 18. A positive electrode 24 is provided in the positive electrolyte chamber 20, while a negative electrode 26 is provided in the negative electrolyte chamber 22. The positive electrolyte tank 3 and the negative electrolyte chamber 22 are connected by an inlet pipe line 38 and an outlet pipe line 39. A pump 40 is provided in the inlet pipe line 38. The pump 40 is used to circulate the positive electrolyte stored in the positive electrolyte tank 3 through a circulation path including the positive electrolyte tank 3, the inlet pipe line 38, the negative electrolyte chamber 22 and the outlet pipe line 39. Voltage applying means, merely shown symbolically, apply a voltage between the positive and negative electrodes 24 and 26 so that a portion of the $Fe^{3+}$ ions contained in the positive electrolyte can be changed to $Fe^{2+}$ ions.

The positive electrolyte chamber 20 is connected to a formic acid solution tank 41 through a supply pipe line 36 and a recycle pipe line 37. The supply pipe line 36 sends formic acid solution from the formic acid solution tank 41 into the positive electrolyte chamber 20. The recycling pipe line 37 introduces the formic acid solution discharged from the positive electrolyte chamber 20, into the formic acid solution tank 41. Gas-liquid separating means 28 for separating carbon dioxide gas from the received formic acid solution is provided in the recycling pipe line 37. This gas-liquid separating means 28 is provided if required but it is not an essential element for the present invention. A pump 32 is provided in the supply pipe line 36. The pump 32 is used to circulate the formic acid solution stored in the formic acid solution tank 41 through a circulation path including the formic acid solution tank 41, the supply pipe line 36, the positive electrolyte chamber 20, the recycle pipe line 37 and the gas-liquid separating means 28 provided in the recycling pipe line 37.

In the following, the present method for regenerating electrolyte of the redox flow battery using the above described electrolyte regenerating apparatus will be described. In the following description, $Fe^{3+}/Fe^{2+}$ ions are used as the positive reactant and $Cr^{3+}/Cr^{2+}$ ions are used as the negative reactant.

First, while charging and discharging operations are repeated in the redox flow battery 1, the amount of $Fe^{3+}$ ions, or $Cr^{3+}$ ions of the oxidation-reduction pairs becomes excessive and the electrolyte deteriorates as described above.

Because of the deterioration of the electrolyte, the positive electrolyte having excessive $Fe^{3+}$ ions, is supplied from the positive electrolyte tank 3 to the negative electrolyte chamber 22. Then, the formic acid solution is supplied from the formic acid solution tank 41 to the positive electrolyte chamber 20. Thereafter, voltage is applied between the positive and negative electrodes 24 and 26. Then, an electrochemical reaction indicated by the following formula (7) occurs in the negative electrolyte chamber 22 and $Fe^{3+}$ ions are changed to $Fe^{2+}$ ions.

$$Fe^{3+} + e^- \rightarrow Fe^{2+} \tag{7}$$

Hereafter, the positive electrolyte passes through the outlet pipe line 39 and returns into the positive electrolyte tank 3. Thus, a normal balance is regained in the oxidation-reduction pairs of the electrolyte of the redox flow battery 1 and the battery capacity of the redox flow battery 1 is restored to the initial capacity value.

On the other hand, an electrochemical reaction indicated by the following formula (8) occurs in the positive electrolyte chamber 20 and carbon dioxide and oxygen are generated.

$$\tfrac{1}{2} HCOOH \rightarrow \tfrac{1}{2} CO_2 + H^+ + e^- \tag{8}$$

$$\tfrac{1}{2} H_2O \rightarrow 1/4 O_2 + H^+ + e^- \tag{9}$$

Since the formic acid solution circulates in the circulation path including the formic acid solution tank 41, the supply pipe line 36, the positive electrolyte chamber 20, the recycle pipe line 37, and the gas-liquid separator 28 provided in the recycle pipe line 37, the carbon dioxide gas and oxygen gas generated by the above indicated electrochemical reaction, are separated by the gas-liquid separator 28. Since the carbon dioxide gas and oxygen gas are not noxious, they can be emitted directly into the air and a special gas absorbing device 28 is not required. Consequently, the apparatus can be made compact. Further, since the carbon dioxide gas and oxygen gas are safe for the human body, the apparatus does not need to be airtight and thus the apparatus is easy to handle and to operate. In addition, since the apparatus does not need to be made of a special material, it has an economical advantage. In the apparatus according to the present invention, it is only necessary to supply formic acid and water periodically by amounts compensating for the generations of carbon dioxide gas and oxygen gas and thus the operation of the apparatus is simple.

EMBODIMENT 1

An experiment was carried out by using a redox flow battery having an electrode area of 1500 cm² and an electrolyte regenerating apparatus having an electrode area of 1500 cm². A cation exchange membrane was used as a membrane material in the cells of the redox flow battery. A cation exchange membrane was used also for the cells of the electrolyte regenerating apparatus. Combinations of carbon fiber cloth and graphite plates were used for the positive and negative electrodes. The conditions for the experiment were as follows.

(1) In the redox flow battery 1. electrolyte
positive electrolyte: a solution obtained by dissolving 1 mol of $FeCl_2$ into 3NHCl
negative electrolyte: a solution obtained by dissolving 1 mol of $CrCl_3$ into 3NHCl,
2. current density: 40 mA/cm²
constant current charging and discharging of the formed-under the above mentioned were repeated 50 times under the above mentioned conditions whereby the initial discharge enabling time of 100 minutes was changed to 75 minutes. The electrolyte thus deteriorated were used for a regeneration test.

(2) In the electrolyte regenerating apparatus 1. electrolyte regenerating liquid: formic acid solution, having a concentration of 80 %
2. current density: 40 mA/cm²

Under the above indicated conditions, the electrolyte regenerating apparatus was operated, whereby carbon dioxide gas and oxygen gas were generated and the redox flow battery was regenerated as a battery having a discharge enabling time of about 100 minutes.

EMBODIMENT 2

Under the same conditions as those in the above embodiment 1, a deteriorated electrolyte was prepared. Under the same conditions as those in the embodiment 1, except the use of a 40 % formic acid solution as the electrolyte regenerating liquid, the electrolyte regenerating apparatus was operated. As a result, in the same manner as in the embodiment 1, carbon dioxide gas and oxygen gas were generated and the redox flow battery was regenerated as a battery having a discharge enabling time of about 100 minutes.

However, after the electrolyte regenerating apparatus was repeatedly operated in this case, deterioration of the positive electrode 24 was observed by simple visual inspection. On the other hand, in the case of the embodiment 1, if the electrolyte regenerating operation was repeatedly carried out, deterioration of the positive electrode 24 was not observed. Those results of the experiments indicate that with a large quantity of water, the reaction of the formula (9) occurs more frequently to promote deterioration of the electrode due to oxygen generated by the reaction. Therefore, the concentration of formic acid is preferably at a high value.

EMBODIMENT 3

Figure 5:
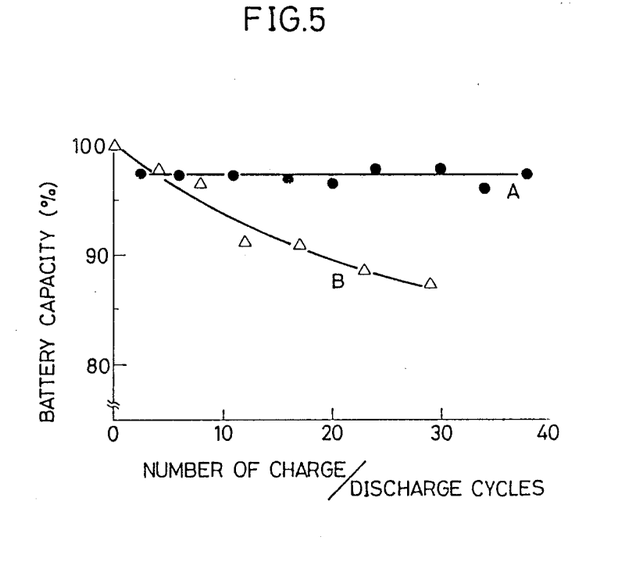
FIG. 5 is a graph showing the relationship between the number of charge/discharge cycles and a battery capacity in a redox flow battery including an electrolyte regenerating apparatus according to the present invention.

Under the conditions of the embodiment 1, two experiments were carried out. One of the experiments was carried out by a method of operating the redox flow battery while stopping the operation of the electrolyte regenerating apparatus. The other experiment was carried out by a method of operating the electrolyte regenerating apparatus while operating the redox flow battery. FIG. 5 shows the results of these experiments, namely, a graph showing the battery capacity in % as a function of the number of charging and discharging cycles. The line A in FIG. 5 represents the result in the case of operating the electrolyte regenerating apparatus while operating the redox flow battery. The line B represents the result in the case of operating the redox flow battery while stopping the operation of the electrolyte regenerating apparatus. Comparing the lines A and B, it is understood that the battery capacity of the redox flow battery is constantly maintained at the initial capacity value if the electrolyte regenerating apparatus is operated while the redox flow battery is operated.

As described above, according to the present invention, a formic acid solution is used as the electrolyte regenerating liquid and accordingly gases generated by the regeneration of the electrolyte are carbon dioxide gas and oxygen gas. Since the carbon dioxide gas and oxygen gas are not noxious, they are safe for the human body and they can be discharged directly into the air. Consequently, a gas absorbing device as used in a conventional electrolyte regenerating apparatus is not required. As a result, the apparatus can be made compact. Further, since the generated carbon dioxide gas and oxygen gas are not noxious for the human body, the apparatus does not need to be made airtight and therefore the manufacturing of the apparatus is easy. In addition, since the electrolyte regenerating apparatus does not need to be made of an expensive corrosion-resistant material, the manufacturing cost can be reduced. Moreover, the maintenance work becomes very simple because it is only necessary in the apparatus according to the present invention to supply periodically formic acid and water by amounts compensating for the generation of carbon dioxide gas and oxygen gas. Contrary thereto it was necessary in a conventional apparatus to the sodium hydroxide in the gas absorbing container and to complementarily supply hydrochloric acid as chlorine gas was generated.

According to the method of regenerating electrolyte of the redox flow battery according to the present invention, generated gases are not noxious carbon dioxide gas and oxygen gas and those gases cause no harm to the human body. Accordingly, electrolyte regenerating operation can be carried out with safety.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A battery system comprising a redox flow battery and a regenerating cell for regenerating an electrolyte of said redox flow battery, said regenerating cell (16), comprising: a negative electrolyte chamber (22) containing a positive electrolyte of said redox flow battery (1) introduced from a positive electrolyte tank (3) of said redox flow battery (1) through an inlet pipe, said negative electrolyte chamber (22) having a negative electrode (26) immersed in said positive electrolyte, a positive electrolyte chamber (20) connected to said negative electrolyte chamber through a membrane (18), said positive electrolyte chamber containing a formic acid solution and having a positive electrode (24) immersed in said formic acid solution, voltage applying means for applying a voltage between said positive and negative electrodes (24, 26) to emit electrons from said formic acid solution for changing a portion of metal ions contained in said positive electrolyte and having a high valence state, to metal ions having a lower valence state, and an outlet pipe for returning, to said positive electrolyte tank, said positive electrolyte containing low valence state metal ions produced by an application of a voltage by said voltage applying means to said positive and negative electrodes (24, 26).

2. The battery system of claim 1, further comprising: a formic acid solution tank for storing said formic acid solution to be supplied to said positive electrolyte chamber, a supply pipe for sending the formic acid solution from said formic acid solution tank to said positive electrolyte chamber, and a return pipe for recycling said formic acid solution discharged from said positive electrolyte chamber, to said formic acid solution tank.

3. The battery system of claim 2, further comprising: gas-liquid separating means connected in said return pipe, for separating carbon dioxide gas from said formic acid solution.

4. The battery system of claim 1, wherein said formic acid solution is a water solution containing formic acid of 40 wt.% or more.

5. The battery system of claim 4, wherein said formic acid solution is a water solution containing formic acid of 80 wt.% or more.

6. A method for regenerating an electrolyte of a redox flow battery, comprising the steps of: introducing a positive electrolyte from said redox flow battery into a negative electrolyte chamber having a negative electrode, introducing a formic acid solution into a positive electrolyte chamber having a positive electrode and being connected to said negative electrolyte chamber through a membrane, applying a voltage between said positive electrode and said negative electrode for emitting electrons from said formic acid solution for changing a portion of metal ions having a high valence state contained in said positive electrolyte, to metal ions having a low valence state, and returning, to said redox flow battery, said positive electrolyte containing metal ions of said low valence state.

7. The method for regenerating electrolyte according to claim 6, further comprising the steps of: returning said formic acid solution from which said electrons are emitted, from said positive electrolyte chamber, to a formic acid solution tank, and separating carbon dioxide gas from said returned formic acid solution.

8. The method for regenerating electrolyte according to claim 6, further comprising the steps of: circulating said formic acid solution between said positive electrolyte chamber and said formic acid solution tank for storing said formic acid solution, and newly supplying formic acid solution of a predetermined concentration to compensate for an amount of said formic acid solution consumed in said formic acid solution tank.

9. The method for regenerating electrolyte according to claim 6, wherein said formic acid solution is a water solution containing formic acid of 40 wt.% or more.

10. The method for regenerating electrolyte according to claim 9, wherein said formic acid solution is a water solution containing formic acid of 80 wt.% or more.

11. The method for regenerating electrolyte according to claim 6, wherein said metal ions are iron ions.

12. The method for regenerating electrolyte according to claim 6, wherein said negative electrolyte of said redox flow battery includes $Cr^{3+}$ ions and $Cr^{2+}$ ions.

13. The method for regenerating electrolyte according to claim 6, wherein said steps are executed when an operation of said redox flow battery is stopped.

14. The method for regenerating electrolyte according to claim 6, wherein said steps are executed while said redox flow battery is operated.

* * * * *